Jan. 22, 1935.  J. O. HEINZE  1,988,594
WHEEL BRAKE CONSTRUCTION
Filed Sept. 9, 1932   2 Sheets-Sheet 1

INVENTOR
John O. Heinze,
BY
ATTORNEYS

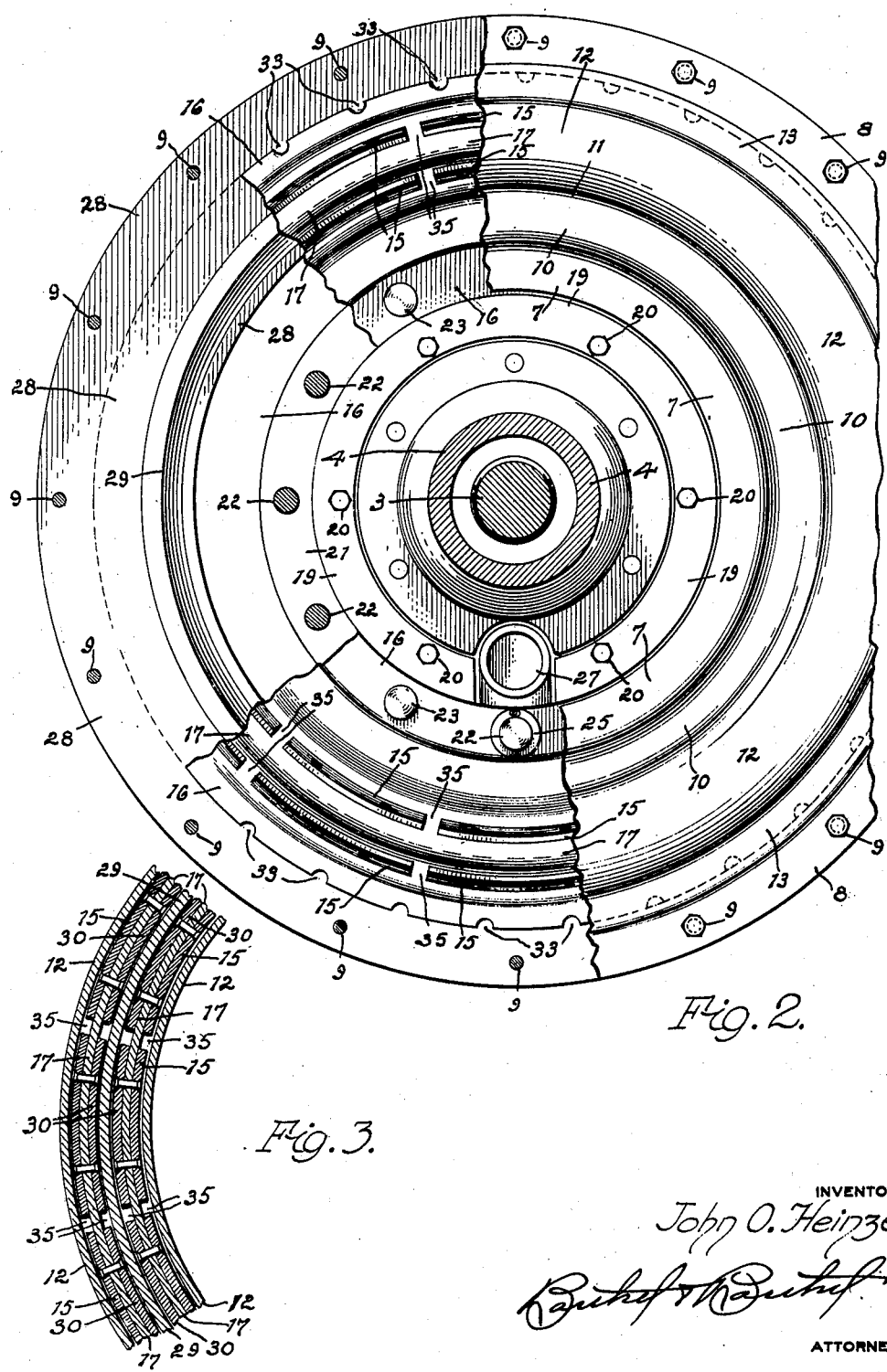

Patented Jan. 22, 1935

1,988,594

UNITED STATES PATENT OFFICE 1,988,594

WHEEL BRAKE CONSTRUCTION

John O. Heinze, Detroit, Mich., assignor to Heinze Development Company, a corporation of Michigan Application September 9, 1932, Serial No. 632,402

8 Claims. (Cl. 188—152)

This invention relates to a wheel brake mechanism, and more particularly to an internal brake construction particularly adaptable to wheels of motor vehicles.

An object of the invention is to provide a combined brake drum and housing especially adapted for the application thereto of internal brake mechanism to be operated by fluid under pressure, the arrangement being such as to provide double braking action upon opposite sides of the drum by an expanding action or movement in opposite directions of brake shoe elements, upon application of fluid pressure within said brake shoe structure. A further object is to provide an arrangement whereby braking force will be applied laterally of the drum in opposite directions and a yieldable wedging action secured to increase the effective braking force.

It is also an object to provide an arrangement whereby braking force will be automatically applied should fluid pressure fail for any reason, such as the breaking of or leakage in the line, and to provide an arrangement of elements whereby the braking surfaces are effectually cooled by air flow, under pressure, this same air flow being controllable to effect the setting or releasing of the brakes.

It is also an object to provide a very compact and efficient arrangement not liable to get out of order or become broken by external impact in use, and wherein the drum forms an enclosing housing to protect the internal parts from dirt and consequent wear.

With the above and other ends in view, the invention resides in the matters hereinafter set forth and more particularly pointed out in the appended claims, reference being had to the accompanying drawings, in which;

Fig. 2 is a view of the inner end of the brake drum, showing the same partly in elevation and partly broken away to disclose the internal construction, the axle being shown in cross section; and Fig. 3 is a detail view of a portion of the drum and internal brake shoes in section substantially upon the line 3—3 of Figure 1.

Figure 1:
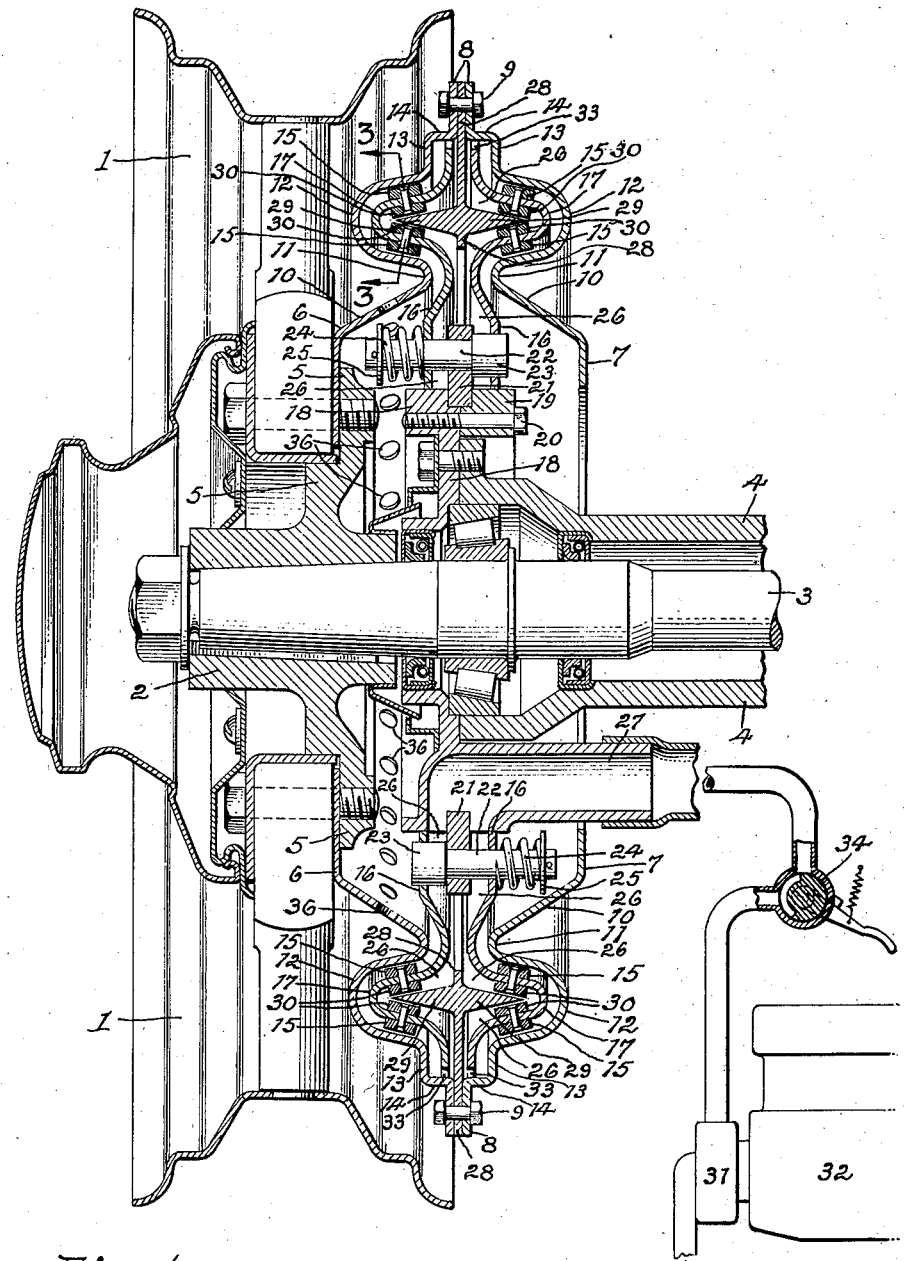
Figure 1 is a vertical axial section through a wheel structure, its hub and axle, and showing, as applied thereto and in section, a brake drum and internal brake mechanism within said drum, illustrative of an embodiment of the present invention, together with air supplying means illustrated diagrammatically.

As shown in Figure 1, an automobile road wheel 1 of the usual construction is shown as having the usual hub 2 mounted upon the axle shaft 3, which in turn, is mounted in bearings within the usual fixed axle housing 4. The hub 2 is provided with the usual outstanding flange 5 to which the spoke assembly is secured in the usual manner, and secured to this flange in any suitable manner, as by the bolts which secure the spoke assembly thereto, is the outer side member or side wall 6 of the brake drum which comprises this member 6 and a similar member 7 forming the opposed or inner side wall of the drum, these members being each formed with a peripheral flange 8 to oppose a like flange on the other member, said flanges being perforated to receive bolts 9 for securing the inner member 7 to the periphery of the outer member 6, said members together thus forming a hollow drum having opposed side walls.

At a short distance radially outward from the inner edge of its side wall, each drum wall is bent or formed inwardly toward the opposed wall, forming each wall with an inclined portion 10 extending inwardly of the hollow drum and radially outward, and each wall is then formed with a comparatively sharp annular bend 11, these bends of the opposed walls being spaced apart, and from these bends the walls are continued outwardly of the drum in a sweeping curve which is substantially semi-circular in cross section, forming a hollow annular rib or channel 12 on each wall outwardly of the drum from the bends 11, and the outer sides of which drum walls are continued radially outward as at 13 and then bent inward as at 14 to meet the flanges 8 and form a hollow annular chamber at the periphery of the drum, outwardly from the opposed hollow ribs or annular channels 12, the side walls of each of which ribs or channels 12 are, in cross section, inclined outwardly of the drum and toward each other to form internal annular inclined and opposed friction or contact surfaces for the engagement therewith of outer friction members or mutilated bands 15 hereinafter described.

Within this hollow brake drum or casing formed by the two members 6 and 7, are like and opposed annular members 16 forming brake shoes each formed with a hollow annular rib or channel 17, conforming in cross sectional shape to the cross sectional shape of the hollow annular ribs or channels 12 on the opposed walls of the drum, and these annular projections 17 on said shoes 16, project into the hollow ribs or annular channels 12 with a space therebetween in which spaces are located the friction members or bands 15 which are rigidly secured to the opposite outer sides of the channels 17, so that by moving these shoes 16 laterally in opposite directions, these friction members 15 will be brought into contact with the inclined sides of the hollow channels or ribs 12 of the drum walls to frictionally resist rotation of the wheel 1 to which the drum is secured to turn therewith, said shoes being operatively connected to the axle housing 4 as hereinafter described, to prevent rotation of said shoes.

Due to the inclination outwardly toward each other of the sides of the hollow drum channels 12 and into frictional contact with which the friction bands 15 of the internal shoes are brought by a movement of these shoes toward the opposed drum walls, a wedging action of the hollow ribs or channels 17 of the shoes, is secured within the drum channels 12, thus making the braking action more effective with less power required to effect such braking action. Also release of the shoes from engaged position is more quickly effected due to this wedge construction and with less movement of the shoes.

The opposed shoes 16 are spaced apart within the drum with their peripheral outer edges in sliding contact with the portions 14 of the drum walls, and these shoes are of such internal diameter that they fit at their inner edges and slide upon the peripheries of a flange member 18 secured to the end of the fixed axle housing 4 and upon a ring 19 secured by bolts 20 to the inner side of said flange, the abutting faces of said ring and flange being formed with peripheral mating grooves to receive an anchoring ring 21 which is rigidly held in said grooves by being clamped between said flange and ring 19 when said ring is secured in place by the bolts 20. This anchor ring 21 projects radially outward beyond the faces of flange and ring 19 upon which said shoes slide toward and from each other, and in this anchoring ring is a series of holes to receive a series of pins 22, each pin having an elongated cylindrical head 23 at one end to engage a series of openings in the shoes, and further assist in guiding said shoes in their movement toward and from each other, said head 23 on certain of said pins engaging openings in one shoe, and these heads on adjacent pins of the series, engaging the openings therefor in the other shoe, and sleeved upon the shank of each pin, is a coiled spring 24 abutting at one end a collar 25 held upon the end of the pin shank in any suitable manner, as by a cotter pin, and the opposite ends of said springs abut the outer faces of the shoes where the shanks of the pins pass therethrough, these springs on the pins extending in one direction, thus serving to yieldingly force one shoe laterally in one direction, and the springs on the set of pins extending in the other direction, serving to yieldingly press the other shoe laterally in the opposite direction. The two shoes are thus yieldingly pressed toward each other by said springs and are normally held with their friction bands 15 out of contact with the adjacent surfaces of the drum.

The space between the adjacent sides of the shoes 16, forms an air chamber 26 into which air under pressure is introduced in a manner hereinafter set forth, through a pipe 27 formed integral with the flange 18, and this air so introduced into said chamber, will force said shoes 16 apart against the action of said springs 24 to bring the friction members 15 carried by said shoes, into contact with the inclined sides of the hollow ribs 12 on the drum walls, thus causing the annular projecting ribs 17 on said shoes, to wedge within said ribs 12 and create strong frictional contact of shoes with drum to give the desired braking action.

Centrally within the drum and between the shoes 16, is secured an annular fixed brake plate 28 by placing its peripheral portion between the flanges 8 of the drum and rigidly fastening it in place by means of the bolts 9 which are passed through openings in said plate, and this plate is formed near its inner edge with annular wedge ribs 29 which project laterally from the sides of the plate in opposite directions, and, in cross section, are of substantially V-shape to wedge into the hollow ribs or channels 17 of the two brake shoes. The inclined side faces of these ribs 29 thus form fixed friction surfaces to be engaged by interrupted bands or friction members 30 secured upon the inner sides of the inclined side walls of the hollow ribs 17 on the brake shoes 16, and therefor, whenever air pressure in the chamber 26 between the brake shoes is discontinued for any reason, the springs 24 will act to move said shoes toward each other and bring the friction members 30 carried thereby, into frictional contact with said ribs 29 of said fixed internal brake plate 28, with a wedging action, due to the cross sectional shape of said ribs. The brake shoes 16 therefore act in both directions to resist rotation of the wheel 1, but when said shoes are held in mid position, as shown in Figure 1, by the right amount of air pressure in the chamber 26, these shoes will be out of contact with both drum and internal fixed brake member 28, and the wheel may turn freely.

Air under pressure may be supplied in any suitable manner from any suitable source, to maintain a certain amount of pressure in the chamber 26 and thus hold the shoes 16 in free or mid position, but it is preferable that a continuously operating device, such as a pump 31 driven by the vehicle engine 32, as illustrated diagrammatically in Figure 1, be provided, so that air pressure in said chamber may not only be maintained, but so that there may be a constant flow of air into said chamber and out at the periphery thereof, through small openings or notches 33 formed in the peripheries of the shoes 16, this flow of air to said chamber from said pump, being controlled by a suitable manually operable valve 34 so that the pressure in said chamber may be accurately regulated to provide just sufficient pressure to hold the said shoes in mid position and free, and to increase the pressure to move said shoes into contact with the drum. Should pressure in said chamber be discontinued due to the breaking of the air supply line or some other accident, or, where the air pump is driven by the vehicle motor, due to the shutting down of the engine, the inner braking mechanism including the brake plate 28 will automatically become effective.

By providing the small openings 33 at the periphery of the chamber 26, a restricted flow of air is permitted from said chamber into the outer ends of the spaces between said shoes and drum walls, and in order to permit this air to flow freely inward through these spaces past the friction bands 15, each of these bands is made up of a plurality of short sections with spaces 35 between the ends of adjacent sections, as shown in Figure 3, and therefore the air forced into said chamber may flow through said chamber past the friction members 30 which are likewise made up of a plurality of spaced sections, thence out through the small restricted openings 33 into the spaces between said shoes and drum walls, through the spaces 35 between friction members, and out through the central opening of the drum wall 7 at one side, and through openings 36 in the drum wall 6 at the other side. The friction members and surfaces are therefore effectually cooled by this flow of air which is maintained by the air pump 31, and all parts of the brake shoes are cooled, the arrangement of the drum members 6 and 7 also providing a casing to direct this air flow and to enclose and protect the internal brake parts from dirt and against external impact blows. Further, the configuration in cross section of both the hollow annular ribs or channels 12 and 17, is such as to provide a slight yielding of the walls of these channels when the shoes are forced laterally by heavy air pressure into braking position, thus increasing the firm frictional contact of the friction members with the inner surfaces of the drum channels, and by the arrangement of the internal brake member 28, this brake is automatically applied by the springs 24, upon failure from any cause, of air pressure within the chamber 26.

Obviously changes may be made in the construction and arrangement of parts, within the scope of the appended claims, without departing from the spirit of the invention, and I do not, therefore limit myself to the particular construction shown.

Having thus fully described my invention, what I claim is:

1. In a brake mechanism, the combination of a rotatable drum having opposed walls, a pair of non-rotatable annular members in said drum independently movable toward and from each other into and out of engagement with said walls, a member carried by said drum and positioned between said non-rotatable members to be engaged by said members upon movement thereof toward each other, and means for yieldingly holding said members out of contact with said walls, said members being moved against the action of said means by fluid under pressure.

2. In a brake mechanism, the combination of a rotatable drum forming an enclosure for internal brake instrumentalities including non-rotatable means within said drum to frictionally engage said drum and forming an air chamber, and means for introducing a continuous flow of air under pressure into and through said chamber to operate said non-rotatable means and effect a cooling of said instrumentalities.

3. In a brake mechanism, the combination of a rotatable drum forming a casing for internal brake instrumentalities including a pair of members having friction means to engage said drum and forming between said members, an air chamber, and means for supplying air under pressure to said chamber, said members being formed to permit air to flow from said chamber into said drum and past said friction means to cool the friction surfaces.

4. In a brake mechanism, the combination of a rotatable drum forming a casing for internal brake instrumentalities including a movable brake member having friction means on opposite sides thereof, a brake member fixed to said drum to be engaged by said friction means on one side of said movable brake member, and means for introducing air under pressure into the space between said movable and fixed members to normally hold said movable member with its friction means out of contact with said fixed member and to move said movable member to bring its friction means into contact with said drum.

5. In a brake mechanism, the combination with a rotatable drum forming a casing to enclose internal brake instrumentalities including a pair of spaced apart non-rotatable, laterally movable friction members to engage opposed walls of said drum and to form between said members, an air chamber, a brake member in said chamber rotatable with said drum, means for supplying air under pressure to said chamber, and yieldable means for moving said friction members laterally into contact with said brake member when air pressure is reduced in said chamber.

6. In a brake mechanism, the combination with a rotatable drum having opposed walls each formed with an annular portion having opposed sides, non-rotatable and laterally movable members in said drum and each formed with an annular projecting portion to engage within said annular portions of said drum walls, an annular member fixed to said drum and projecting inwardly thereof between said laterally movable members and formed with annular projections to engage within said annular portions of said laterally movable members, and yieldable means to urge said laterally movable members toward said member fixed to said drum.

7. In a brake mechanism, the combination with a rotatable drum forming a casing for internal brake instrumentalities including non-rotatable and laterally movable brake shoes within said drum engaging, at their outer edges, said drum and at their inner edges, a fixed support to form an air chamber between said shoes, said shoes being formed at their outer edges to permit a restricted flow of air from said chamber into said drum, said shoes being provided at their outer sides, with spaced apart friction members to engage opposed walls of said drum, yieldable means for moving said shoe members toward each other, and means for introducing air under pressure into said chamber.

8. The combination with a wheel hub and a fixed axle of a motor vehicle, of a brake drum forming a casing to enclose internal brake instrumentalities and having opposed side walls with one of said walls secured to said hub, a pair of annular brake shoes in said drum with their inner edge portions engaging and slidable upon an annular support secured to said axle, said shoes forming between them, an air chamber, spaced apart friction members on the outer side of each of said shoes to engage said side walls of said drum, an annular brake member secured adjacent its periphery to said drum and projecting into said air chamber between said shoes, friction members on the inner sides of said shoes to engage said annular brake member, yieldable means to move said shoes toward said brake member, and means for introducing air under pressure into said air chamber.

JOHN O. HEINZE.